March 10, 1931. T. E. TAYLOR 1,795,523
BROILER PAN
Filed Oct. 9, 1929
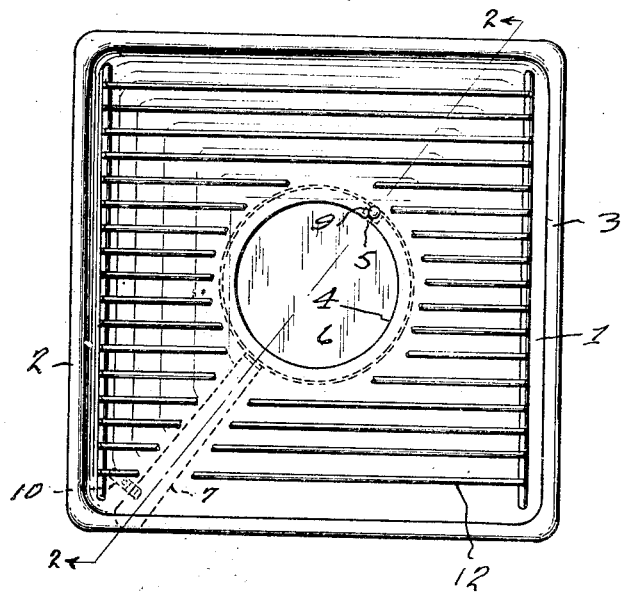
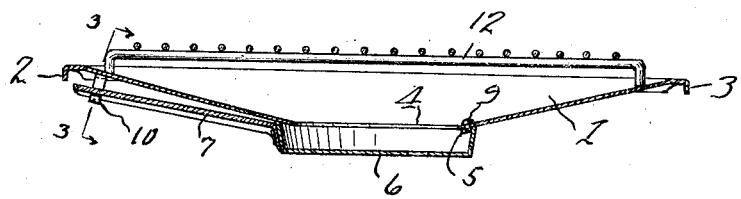
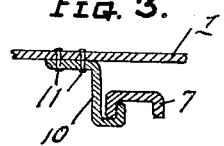 

Patented Mar. 10, 1931

1,795,523

UNITED STATES PATENT OFFICE

THOMAS E. TAYLOR, OF MANSFIELD, OHIO, ASSIGNOR TO THE TAPPAN STOVE COMPANY, OF MANSFIELD, OHIO, A CORPORATION OF OHIO

BROILER PAN

Application filed October 9, 1929. Serial No. 398,319.

This invention relates to a broiler pan which is particularly adapted for use in connection with gas ranges.

The main object of the invention is to provide a broiler pan of the character described which is provided with an opening and to the underside of which is detachably secured a receptacle or pan for receiving the contents which may drain therethrough.

Another object of the invention is to provide a broiler pan of the character described to the bottom side of which is pivotally secured a receptacle or pan which is readily removable therefrom.

Another object of the invention is to provide a broiler pan in which the juices which escape during the cooking process will be collected and held a sufficient distance away from the flame so that they will not boil or ignite from the flame.

A further object of the invention is to provide a broiler pan which will accomplish the objects of the invention as hereinbefore stated and which is well adapted for quantity production at comparatively low cost.

Further and more limited objects of the invention will appear as the description proceeds and by reference to the accompanying drawings in which Fig. 1 is a top plan view of my broiler pan with a portion of the rack cut away; Fig. 2 is a vertical sectional view on the line 2—2 of Fig. 1; Fig. 3 is a vertical sectional view on the line 3—3 of Fig. 2; and Fig. 4 is a view partly in side elevation and partly in section disclosing the detachable receptacle or pan.

Referring now to the drawings, the reference character 1 designates the broiler pan which is preferably rectangular in shape and formed of a single piece of metal. The opposite sides of the pan are provided with overhanging flanges 2 and 3 which slide upon glides arranged within the broiling compartment in a manner well known to those skilled in the art. The bottom of the broiling pan slopes inwardly toward the central portion thereof and is there provided with an opening 4 which is preferably annular in shape. The edge of the opening 4 is provided with a slot 5, the purpose of which will hereinafter appear. Disposed below the opening 4 is a receptacle or pan 6 having a handle 7 which is shaped in cross section as shown most clearly in Fig. 3. The receptacle 6 is provided with an inturned portion or flange 8 to which is secured a pin or button 9 which is disposed on the side of the receptacle opposite to the handle 7. Carried by the underside of the broiler pan and adjacent one corner thereof is a bracket 10 which is secured thereto in any suitable manner, as by means of suitable rivets 11. The receptacle 6 is pivotally secured to the pan with the pin or button 9 engaged in the slot 5 and with the handle 7 supported by the bracket 10. When it is desired to remove the receptacle or pan 6, the handle is removed from the bracket and then swung above an arc of about 45° so that it can be grasped in the hand. Arranged within the pan is a broiling rack 12 having suitable legs thereon so that the rack will be supported at a slight distance from the bottom of the pan. Any juices which may escape during the broiling process will drop onto the bottom of the pan and drain through the opening 4 into the receptacle 6. The receptacle 6 may be removed and the juices used to baste the food or for any other purpose. With my broiling pan any juices which may escape during the broiling process will be caught in the receptacle 6 which is disposed such a distance away from the flame that the likelihood of the grease boiling or becoming ignited from the flame will be reduced to a minimum.

It will now be clear that I have provided a broiling pan which will accomplish the objects of the invention as hereinbefore stated. Various changes may be made in details of construction as well as in the manner of supporting and securing the various parts in place. It will therefore be understood that my invention is limited only in accordance with the scope of the appended claims.

Having thus described my invention, what I claim is:

1. A broiler pan having an opening therein, a pan detachably secured over said opening and having a handle projecting therefrom, and cooperating means on said pan and receptacle engaging said handle and one edge of said receptacle for detachably securing said receptacle beneath said opening.

2. A broiler pan having a centrally disposed opening therein, a pan disposed below said opening and having a handle thereon, means pivotally securing said receptacle to said pan, and means disposed adjacent one edge of said pan for supporting said handle.

3. A broiler pan having an opening therein, a receptacle disposed below said opening, said opening having a slot in one edge thereof, said receptacle having a pan therein adapted to engage in said slot, a handle for said receptacle, and means disposed adjacent one edge of said pan for supporting said handle.

4. A broiler pan having an opening therein, a receptacle disposed below said opening and pivotally secured to said pan, a handle for said receptacle, and means disposed adjacent one edge of said pan for supporting said handle.

5. A broiler pan having an opening therein, a receptacle disposed below said opening, said opening having a slot in one edge thereof, said receptacle having a projection thereon adapted to engage in said slot, a handle for said receptacle, and means disposed adjacent one corner of said pan for supporting said handle.

6. A broiler pan substantially rectangular in shape and having a centrally disposed opening therein, a receptacle pivotally secured to said pan and disposed beneath said opening, a handle for said receptacle, means disposed adjacent one corner of said pan for supporting said handle, the handle being of such length as to project beyond the edge of said pan in one position of said receptacle.

In testimony whereof, I hereunto affix my signature.

THOMAS E. TAYLOR.